United States Patent [19]

Pickens et al.

[11] Patent Number: 4,817,134
[45] Date of Patent: Mar. 28, 1989

[54] AUTOMATED MATRIX FOR COMMUNICATION LINE CONNECTIONS

[75] Inventors: Herman L. Pickens, Gurley; William E. Cooley, Arab, both of Ala.

[73] Assignee: SX Corporation, Arab, Ala.

[21] Appl. No.: 106,569

[22] Filed: Oct. 9, 1987

[51] Int. Cl.⁴ .................. H04Q 1/20; H04Q 3/545
[52] U.S. Cl. ................... 379/291; 200/176; 340/825.83; 379/29
[58] Field of Search ........... 379/303, 306, 335, 291, 379/1, 29; 200/176, 177; 340/825.83, 825.79

[56] References Cited

U.S. PATENT DOCUMENTS

| | | | |
|---|---|---|---|
| 2,516,772 | 7/1950 | Hickman | 379/291 |
| 3,796,848 | 3/1974 | Southworth, Jr. | 200/175 |
| 3,969,594 | 7/1976 | DeLuca et al. | 379/92 |
| 4,520,234 | 5/1985 | Fields et al. | 379/29 |

FOREIGN PATENT DOCUMENTS 0079666  5/1984  Japan ..................... 379/29

Primary Examiner—Thomas W. Brown
Attorney, Agent, or Firm—Jennings, Carter, Thompson & Veal

[57] ABSTRACT

A crossconnect system utilizes a computer accessed matrix of crosspoints formed by a set of parallel conductors oriented perpendicular to a second set of parallel conductors with the sets lying in parallel planes. The crosspoints form open contacts which can be closed by stepper motor driven spring contacts to connect selected conductors from one set with selected conductors from the other set. A microprocessor system drives the stepper motor and implements movement of the spring contacts to the selected crosspoints.

16 Claims, 3 Drawing Sheets

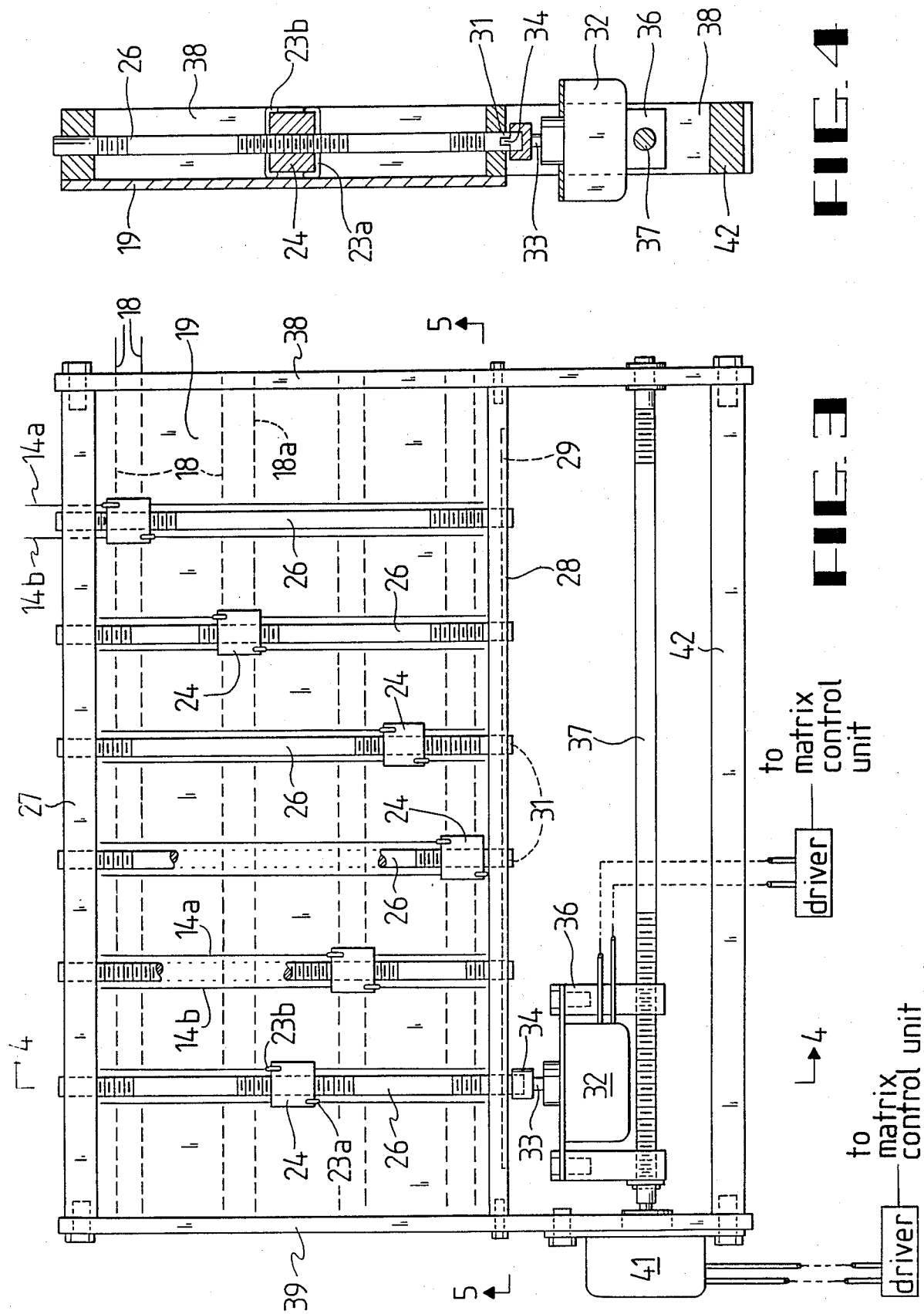

AUTOMATED MATRIX FOR COMMUNICATION LINE CONNECTIONS

FIELD OF THE INVENTION

The present invention relates to the field of communication and more particularly to those aspects of communication wherein the medium through which the communication is conducted are electrical conductors. More particularly the present invention relates to a communication system having a plurality of dedicated terminal devices which are connected to dedicated electrical conductors. In even greater particularity the present invention relates to apparatus for connecting each of the dedicated conductors to a selected transmission line for communication with a remote location.

BACKGROUND OF THE INVENTION

The present system may be most easily understood by referring to the familiar commercial telephone system. As is well known, the telephone system is composed of a number of central offices, each of which is typically located in a city or other population center. Each central office services a number of remote terminals, each of which is located in another smaller population center which may be several miles from the central office. Each remote terminal services a number of subscriber lines and thus is sometimes referred to as a remote concentrator in as much as all of the subscriber lines are brought together for connection to lines running to the central station. For example, there may be 96 lines running from each remote terminal to the central station and there may be 125 subscriber lines (cable pairs) concentrated at the remote terminal. It should be understood that the remote terminal is installed with more lines and cable pairs than are initially needed to allow for growth upon installation. Also spare lines and cable pairs are needed to replace damaged or defective line or cable pairs. To provide service to a subscriber, a spare line from the remote terminal is connected to a spare cable pair going near the subscriber's residence or business.

Each connection of the cable pair to a line, whether for installation, repair, or disconnection, is typically made by hand by telephone personnel dispatched to the remote terminal. This is a very labor intensive operation which entails not only the labor on site but also the time and cost of transporting personnel to the remote terminals.

From the foregoing, it may be seen that considerable effort is required to simply make the proper connection, even when well known terminal equipment is being used. An analogous problem is presented in various applications wherein a number of terminal devices, such as sensors are distributed to provide data or information to a central unit. As in the telephone system, each unit must be individually connected at considerable expense.

SUMMARY OF THE INVENTION

It is the principal object of our invention to eliminate the need for service personnel to go to the remote terminals and the like to make line connections or disconnections.

Another object of the invention is to provide the ability to test lines and cable pairs remotely before connecting them or while they are in service.

Our invention advantageously permits the use of inexpensive technology to accomplish these objects and to provide other advantages by using a crossconnect matrix formed by an array of crosspoint contact pairs, with one contact of each pair connected to a line conductor and the other contact connected to one conductor in a cable pair oriented perpendicular thereto. A shorting contact assembly is provided for each line or each cable pair and is movable along the line or cable pair via a stepper motor to a selected crosspoint, whereupon the line and cable pair are connected together. The stepper motors are controlled and monitored by a microprocessor which receives instructions from and sends information to a remote location, for example, the central office.

BRIEF DESCRIPTION OF THE DRAWINGS

Apparatus incorporating features of our invention are depicted in the accompanying drawings which form a portion of this disclosure and wherein:

FIG. 3 is a plan view of the matrix portion of our invention;

FIG. 4 is a side elevational view of the matrix portion taken along line 4—4 of FIG. 3;

DESCRIPTION OF A PREFERRED EMBODIMENT

Figure 1:
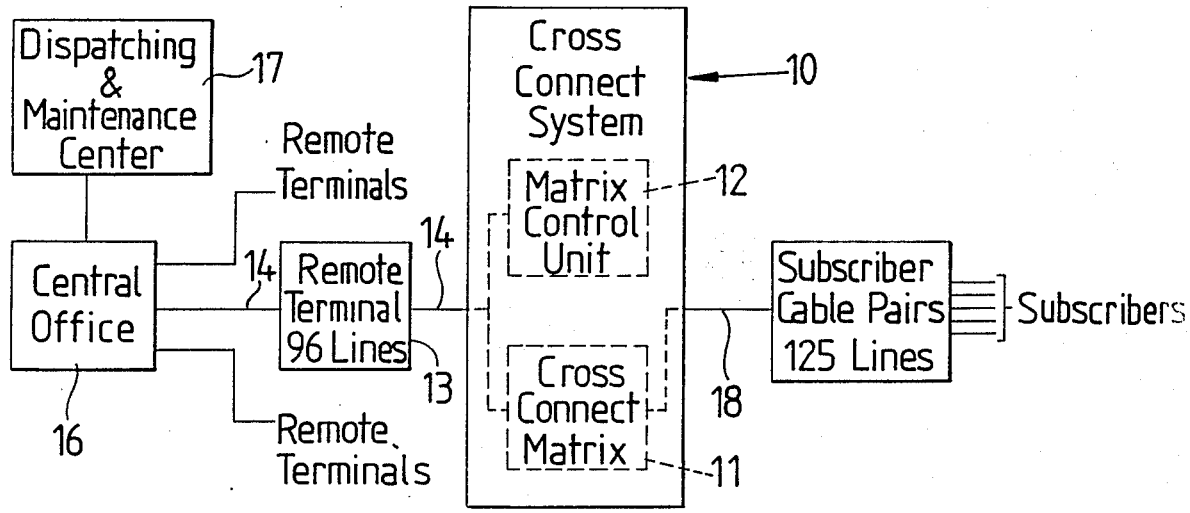
FIG. 1 is a schematic block representation of a system wherein our invention may be utilized.
Figure 5:
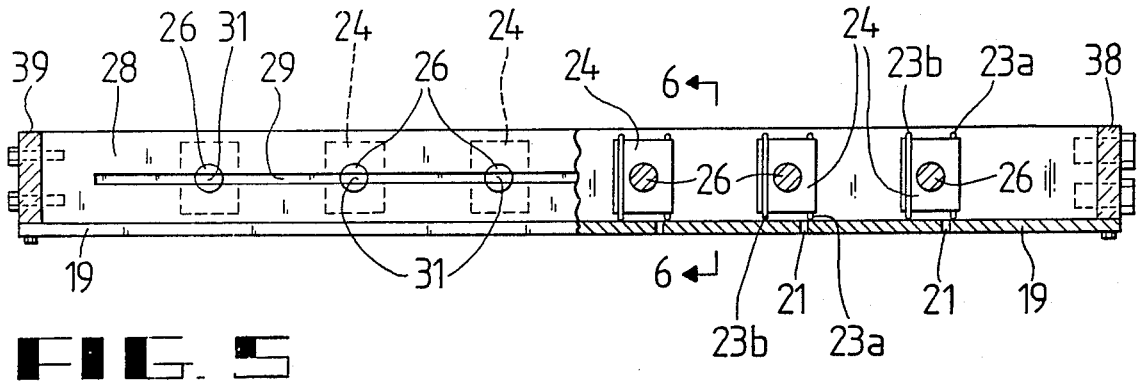
FIG. 5 is a sectional view of the matrix portion of our invention taken along line 5—5 of FIG. 3.
Figure 6:
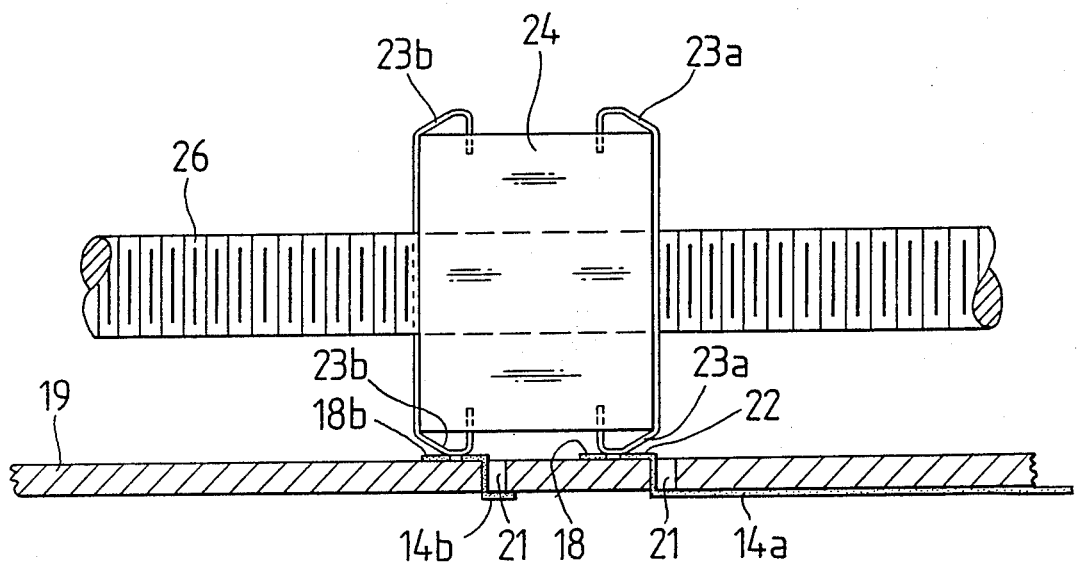
FIG. 6 is a partial view of the carrier assembly and matrix portion taken along line 6—6 of FIG. 5.

Referring to the drawings for a better understanding of the invention, note that FIG. 1 is a representation of a system in which our invention can be used. Our invention is a crossconnect system 10 comprising a crossconnect matrix 11 and a matrix control unit 12. The crossconnect system 10 is physically located at a remote terminal 13 which is connected by a plurality of two wire communication lines 14 to a central office 16, which in turn is in communication with a dispatching and maintenance center 17. The remote terminal 13 serves to concentrate the subscriber cable pairs 18 which are dedicated to a specified end user or unit of terminal equipment. Our crossconnect system 10 provides the interface between the lines 14 and subscriber cable pairs 18. The actual interconnection of the line 14 and cable pairs 18 occurs on the crossconnect matrix 11 shown in FIG. 2 and in more detail in FIGS. 3–6.

Figure 2:
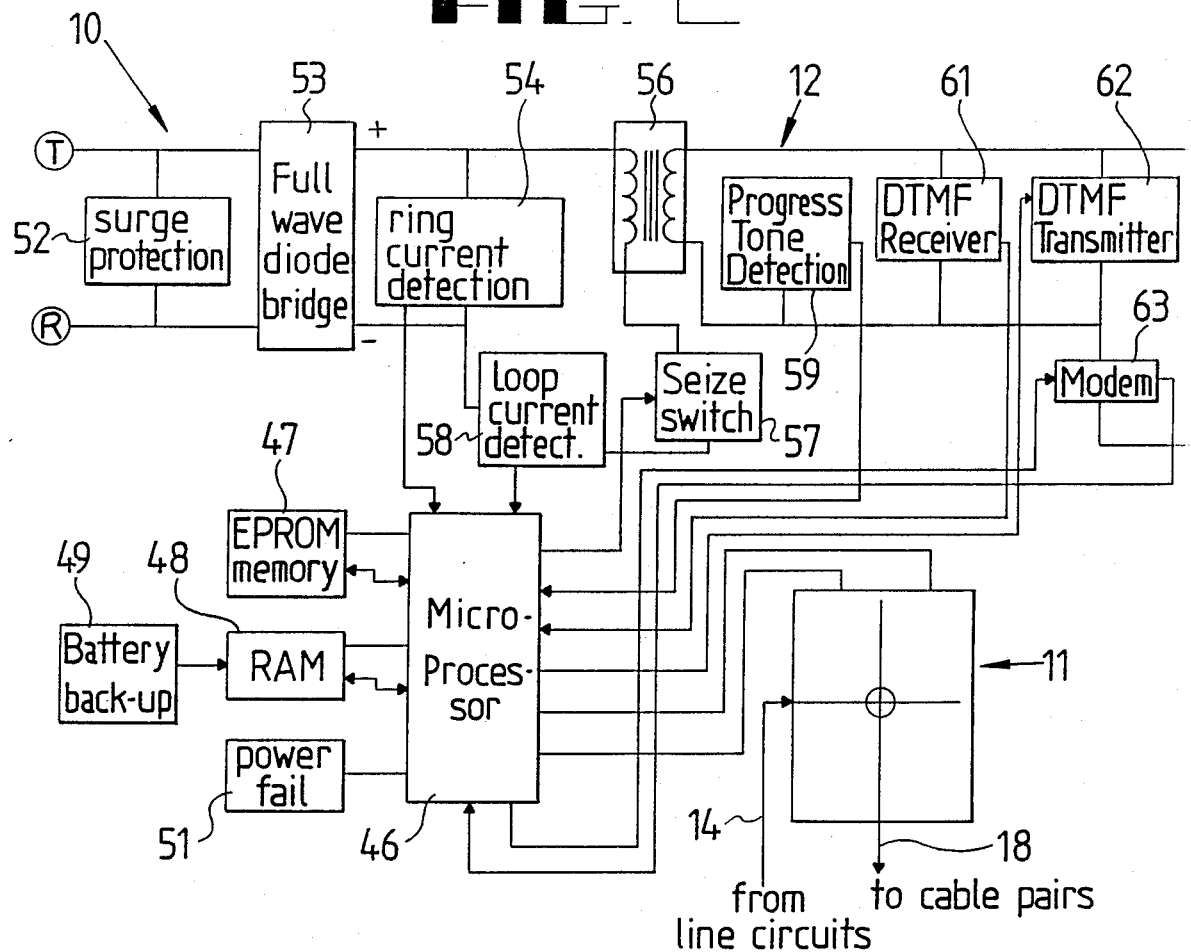
FIG. 2 is a schematic block representation of our invention in greater detail.

As can be appreciated from FIG. 2 and FIG. 3, the lines 14 are connected to the matrix 11 at a set of co-planar parallel line pair elements 14a & 14b. The cable pairs are connected to the matrix at a set of co-planar parallel cable pair elements 18a & 18b with the plane of each set of conductors being parallel and spaced from the plane of the other set. The line pair elements 14a & 14b are oriented perpendicular to the cable pair elements 18a & 18b. Thus it may be seen that the line pair elements 14a & 14b may be formed on one side of a dielectric 19 such as a printed circuit board and the cable pair elements 18a & 18b formed on the opposite side of the dielectric 19, thus the sets of conductors form an ordered grid with identifiable crosspoints, even though the conductors remain separated at the crosspoints.

Interconnection between the conductors at the crosspoints may be accomplished by forming a plated through hole 21 from the conductor on one side of the dielectric 19 through the dielectric proximal each crosspoint and positioning a short conductor segment 22 in the plane of the conductor on the other side of the dielectric 19. Thus the short conductor segment 22 and each conductor of the cable pair element 18a & 18b in FIG. 6 form a set of contacts, which when closed connect line element 14a to cable pair element 18a & line element 14b to cable pair element 18b. Each set of contacts may be closed by a pair of shorting springs 23a & b which slide along one surface of the dielectric until the desired line elements 14a & b and cable pair elements 18a & b are in electrical contact through the shorting springs 23a & b. A pair of shorting springs 23a & b is provided for each pair of line elements 14a & b, and moves over the dielectric along a path parallel to the line elements 14a & 14b. Each pair of shorting springs 23a & b is attached to a non-conducting carrier 24 which threadedly engages a screw or worm 26 such that rotation of the worm 26 moves the carrier 24 axially along the line element 14a & b. The worms 26 for each pair of line elements are mounted for rotation in a frame member 27 and 28 at opposing ends of the dielectric 19. As may be seen in FIGS. 3 and 4, frame member 28 has a slot 29 formed longitudinally therein opening outwardly parallel to the dielectric 19. Also as may be seen in FIG. 4, each end of worm 26 mounted in frame member 28 has a slot 31 formed therein which can be aligned with the slot 29.

Mounted outwardly of frame member 28 is a stepper motor 32 having an output shaft 33 and a tip 34 adapted for sliding engagement within slots 29 and 31. The tip 34 acts like the blade of a screwdriver and has a width less than the diameter of the worm 26 so that it may rotate. The stepper motor 32 is mounted to a carriage 36 which is also threadedly engaged by a worm 37 mounted for rotation in frame member 38 and 39 which extend perpendicularly to frame member 27 and 28. A second stepper motor 41 drives this worm 37 thereby urging motor 32 axially along the worm and thus moving tip 34 along the length of slot 29. Frame member 42 stabilizes the frame members 38 and 39.

Stepper motors 32 and 41 are controlled via conventional stepper motor drivers which in turn receive instructional data from the matrix control unit 12.

The matrix control unit is shown in greater detail in FIG. 2 and includes a microprocessor 46 with an EPROM 47 for storage of software to enable the microprocessor 46 to control the cross connect matrix 11 and to communicate with a remote location such as the dispatching and maintenance center 17. A random access memory (RAM) 48 is provided in conjunction with microprocessor 46 and contains the data base concerning all of the crosspoints in the matrix 11. This information defines which line elements 14a & b are connected to which cable pair elements 18a & b. The RAM 48 must be provided with a battery back-up 49 or other device to prevent loss of this data base in the event of a power failure or the like. For example, a detector 51 for power failure is provided to detect the loss of power in sufficient time for the microprocessor 46 to store current conditions in RAM 48 before loss of power to the microprocessor 46, thus RAM 48 must remain unaffected to enable the microprocessor 46 to resume its operation upon restoration of power.

The microprocessor 46 communicates with the dispatching and maintenance center 17 over a line circuit using Dual Tone Multi-frequency (DTMF) protocol or by using the RS-232C communication protocol. In either event the remaining components of the matrix control unit 12 are described with reference to customary telephone nomenclature which is intended to apply to both telephone systems and other communication systems. The communications line circuit includes a TIP (T) and RING (R) pair which provide input from the remote control area via a surge protector 52, as is commonly known and used, to protect the cross connect system 10 from high voltage surges such as lightning. A full wave diode bridge 53 to maintain the proper polarity as is indicated by the (+) or (−) on the bridge outputs. A voltage detector 54, termed a ring current detector, detects ring voltage across the output of the full wave diode bridge 53 and signals the occurrence of the same to the microprocessor 46. A transformer 56 is used, as is conventional, to provide electrical isolation between the T and R lines and the remainder of the control circuitry. Serially connected to the transformer 56 is a seize switch 57 which is essentially a solid state switch which closes the circuit between the T and R lines. Closure of the seize switch 57 is initiated by the microprocessor 46 either upon receipt of a ring voltage detector signal from voltage detector 54 or to initiate an outgoing message from the cross connect system 10. To assure that the seize switch 57 is operational, a current detector 58 is serially connected therewith and provides a signal to the microprocessor 46 indicative of the presence of current in the circuit.

The secondary of transformer 56 is connected to a progress tone detector 59 which detects such signals as dial tones, busy tones and audible ringing which are signalled to the microprocessor 46 and are used to determine the status of the communication lines for outgoing messages. The microprocessor 46 is interfaced to the secondary of transformer 56 for communication purposes by a DTMF receiver 61 and a DTMF transmitter 62 or a modem 63 depending on whether the DTMF communication protocol or the RS-232C communication protocol is used.

In operation, it is to be understood that the EPROM 47 is programmed in accordance with the needs of the user and the size of the matrix 11. Upon energization, the microprocessor 46 is placed in an idle state and awaits a signal from the voltage detector 54 indicating that a communication from the dispatching and maintenance center 17 is to be received. The microprocessor 46 thereupon signals the seize switch 57 to close the circuit and monitors the current detector 58 for a signal indicating that the circuit has been closed. To initiate a call, the microprocessor 46 sends a seize command to the seize switch 57 and monitors the current detector 58. The progress tone detector 59 then indicates to the microprocessor 46 the status of the communication line. The microprocessor 46 communicates via the DTMF transmitter 62 and receiver 61 or modem 63 in the conventional manner.

The control signals are received by the microprocessor 46 to cause connection of the individual line pair elements 14a & 14b to the selected cable pair elements 18a & 18b. The microprocessor 46 in turn sends signals to the stepper motor drivers 45 which in turn control the stepper motors 41 and 42. Motor 41 turns worm 37 to position motor 32 at the end of a selected worm 26 which runs parallel to the line pair elements 14a & 14b. Note that the tip 34 travels within slot 29 and is positioned within slot 31 at the end of worm 26. Motor 32 turns the selected worm 26 to move the shorting springs 23a & 23b to the selected crosspoint such that the cable pair elements 18a & 18b are electrically connected to the line segment 22 and thus to the line pair elements 14a & 14b. Note that with this arrangement the line pair elements may be connected with any cable pair elements selected. The cable pair elements are spaced apart such that an integral number of revolutions of the worm 26 are required to move the spring contacts 23a & b between adjacent crosspoints thus tip 34 will re-align with slot 29 and the motor 32 is free to move along the worm 37 to position each set of sliding springs 23 as required by the microprocessor 46.

It may thus be seen that if a cable pair is connected to a defective or damaged line pair, the cross connect system 10 can disconnect the cable pair and connect them to an alternate or spare line pair. Likewise if a cable pair becomes non-functional or unnecessary, it may be disconnected from the line pair which is then available for connection to any cable pair. All of which may be accomplished without ever sending a technician into the field, thus effecting a tremendous savings in labor, time and efficiency.

While we have shown our invention in one form, it will be obvious to those skilled in the art that it is not so limited but is susceptible of various changes and modifications without departing from the spirit thereof.

What we claim is:

1. A remotely controllable apparatus for connecting selected pairs of electrical connectors comprising:
    (a) a matrix of perpendicularly oriented electrical conductors forming an array of spaced apart crosspoints with each conductor separated from each other conductor, said matrix comprising a first set of paired conductors oriented in parallel relationship to each other and lying in a first plane, and a second set of paired conductors oriented in parallel relationship to each other and in perpendicular relationship to said first set and lying in a second plane parallel and spaced from said first plane;
    (b) shorting means for selectively connecting a selected pair of conductors from said first set to a selected pair of conductors from said second set including a first conductive member for connecting one conductor of said selected pair of conductors from said first set with a first conductor of said selected pair of conductors from said second set, a second conductive member for connecting another conductor from said selected pair of conductors from said first set with a second conductor from said selected pair of conductors from said second set simultaneously with the connection formed by said first conductive member, and a non-conducting carrier for said first and second conductive members movable parallel to one of a pair of conductors in one of said sets of conductors;
    (c) drive means for moving said shorting means to a crosspoint corresponding to the intersection of said selected pairs of conductors; and
    (d) means for controlling said drive means remotely.

2. Apparatus as defined in claim 1 wherein said drive means comprises a worm attached to said shorting means such that rotation of said worm induces axial motion of said shorting means along said worm; and a stepper motor selectively engageable with said worm to induce rotation thereof with said stepper motor being movable perpendicular to said worm and parallel to said first and second planes.

3. Apparatus as defined in claim 2 wherein said drive means further comprises a stepper motor support movable perpendicular to said worm and parallel to said first and second planes.

4. Apparatus as defined in claim 3 wherein said worm has a bisecting slot formed in one end thereof and said stepper motor has an output shaft formed for cooperative engagement in said bisecting slot for rotation of said worm; and means for aligning said slot with said shaft.

5. Apparatus as defined in claim 1 wherein each conductor of each first set has a conductive tab electrically connected thereto and extending partially with said second plane proximal a selected conductor of said second set.

6. A remotely controllable apparatus for connecting selected pairs of electrical conductors comprising:
    (a) a matrix of perpendicularly oriented electrical conductors forming an array of spaced apart crosspoints with each conductor separated from each other conductor;
    (b) shorting means for selectively connecting a selected conductor to a second selected conductor oriented perpendicular thereto;
    (c) drive means for moving said shorting means to a crosspoint corresponding to the intersection of said selected conductor and said second selected conductor; and
    (d) means for controlling said drive means remotely including means for storing data relating to each crosspoint in said array identifying said crosspoint with reference to the electrical conductors of said matrix forming the same, a programmable controller operatively connected to said drive means for actuating said drive means in accordance with selected data from said storing means and instructions provided from a remote source, communication means for providing message transfer to and from said remote source including means for detecting an incoming message having an output indicative thereof to said programmable controller, interface means for converting said incoming message into instruction for said controller and for generating an outgoing message for transmission to said remote source, and means for accessing a communication path between said controller and said remote source responsive to instruction from said controller.

7. Apparatus as defined in claim 6 wherein said communication path comprises a paired conductor line and said means for accessing comprises a switch for electrically connecting said pair of conductors.

8. Apparatus as defined in claim 7 wherein said means for accessing further comprises means for detecting whether current is present in said paired conductor line.

9. Apparatus as defined in claim 7 wherein said means for accessing further comprises means for detecting status signals present on said conductor pair having an output to said programmable controller.

10. Apparatus for selectively connecting pairs of electrical conductors to other pairs of electrical conductors from a remote location comprising:
    (a) a matrix of paired electrical conductors having a first set of paired electrical conductors disposed in parallel relation in a first plane and a second set of paired electrical conductors disposed in parallel relation in a second plane parallel to said first plane with said first set of paired electrical conductors being oriented perpendicular to said second set;

(b) jumper means associated with each pair of electrical conductors in one of said first or second sets for connecting said pair to a pair of electrical connectors selected from the other set; and (c) means for moving said jumper means along the associated pair of electrical conductors to a crosspoint defined by said associated pair and said selected pair responsive to instructions received from a remote location.

11. Apparatus as defined in claim 10 wherein said first plane and said second plane are separated by a dielectric and wherein each pair of conductors in said first set have an extension thereof through said dielectric into said second plane proximal each intersection of said pair of conductors and each pair of conductors in said second plane.

12. Apparatus as defined in claim 10 wherein said jumper means comprises a dielectric carrier supporting first and second contact elements for connecting each conductor of the associated pair with one conductor of the selected pair.

13. Apparatus as defined in claim 12 wherein said jumper means is mounted for axial movement along a threaded shaft therethrough parallel to said associated pair responsive to rotation of said threaded shaft and said means for moving comprises a first stepper motor adapted to selectively engage a selected threaded shaft for movement of the jumper means along the associated pair of conductors; a second stepper motor operatively connected to move said first stepper motor parallel to said selected conductor for engagement with a selected threaded shaft; control means having outputs to said first and second stepper motors to direct the movements thereof to said selected pair or to said selected threaded shaft respectively and including means for receiving instruction from a remote source as to which paired conductors in said first set are to be connected to which paired conductors in said second set.

14. Apparatus as defined in claim 13 wherein said control means comprises a programmable microcomputer including memory for retaining control instructions; memory for retaining data as to the location of said stepper motors relative to said matrix; input/output connections including output connection to said stepper motors and input from said remote source; and signal transport means for communicating messages between said microcomputer and said remote source.

15. Apparatus as defined in claim 14 wherein said signal transport means is a paired conductor communication line, and said control means further comprises:

(a) means for detecting a voltage on said paired conductor communication line having an output indicative thereof to said microcomputer;

(b) means for providing electrical connection between said paired conductors responsive to a signal from said microcomputer;

(c) means for detecting electrical current through said paired conductor having an output to said microcomputer; and (d) means for decoding electrical signals sent between said microcomputer and said remote source to provide information or instruction thereto.

16. Apparatus as defined in claim 10 wherein said jumper means is mounted for axial movement along a threaded shaft therethrough parallel to said associated pair responsive to rotation of said threaded shaft and said means for moving comprises a first stepper motor adapted to selectively engage a selected threaded shaft for movement of the jumper means along the associated pair of conductors; a second stepper motor operatively connected to move said first stepper motor parallel to said selected conductor for engagement with a selected threaded shaft; control means having outputs to said first and second stepper motors to direct the movements thereof to said selected pair or to said selected threaded shaft respectively and including means for receiving instruction from a remote source as to which paired conductors in said first set are to be connected to which paired conductors in said second set.

* * * * *